United States Patent [19]
Johnston

[11] Patent Number: 5,921,555
[45] Date of Patent: *Jul. 13, 1999

[54] UNI-DIRECTIONAL SEAL FOR USE ON A SHAFT

[75] Inventor: David E. Johnston, East Hebron, N.H.

[73] Assignee: Freudenberg-NOK General Partnership, Plymouth, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,895

[22] Filed: Apr. 10, 1997

[51] Int. Cl.⁶ ........................................... F16J 15/32
[52] U.S. Cl. ................................. 277/559; 277/549
[58] Field of Search ................... 277/307, 309, 277/358, 399, 400, 559, 570, 577, 549, 552

[56] References Cited

U.S. PATENT DOCUMENTS

| | | | |
|---|---|---|---|
| 3,044,786 | 7/1962 | Chillson | 277/549 |
| 3,929,341 | 12/1975 | Clark | 277/559 |
| 3,995,868 | 12/1976 | Smith | 277/560 |
| 4,344,631 | 8/1982 | Winn | 277/552 |
| 4,399,998 | 8/1983 | Otto | 277/552 |
| 4,542,573 | 9/1985 | Bainard | 277/559 X |
| 4,553,564 | 11/1985 | Baram | 137/554 |
| 4,739,998 | 4/1988 | Steusloff et al. | 277/559 X |
| 4,822,058 | 4/1989 | Butler et al. | 277/559 |
| 4,844,480 | 7/1989 | Gralka | 277/559 X |
| 4,969,653 | 11/1990 | Breen | 277/561 |
| 4,986,553 | 1/1991 | Preston et al. | 277/559 |
| 5,044,642 | 9/1991 | Vogt et al. | 277/559 |
| 5,125,672 | 6/1992 | Wycliffe | 277/351 |
| 5,462,287 | 10/1995 | Hering et al. | 277/559 |

*Primary Examiner*—Eric K. Nicholson
*Assistant Examiner*—Greg Binda
*Attorney, Agent, or Firm*—Dinnin & Dunn, P.C.

[57] ABSTRACT

A uni-directional seal member for use on a shaft includes a rigid shell, a support member in contact with the rigid shell, and a resilient sealing member in contact with the support member and an insert washer. The sealing member has a sealing face, where that sealing face has a contact area having a radially extending profile of a cyclically repeating shape.

20 Claims, 3 Drawing Sheets

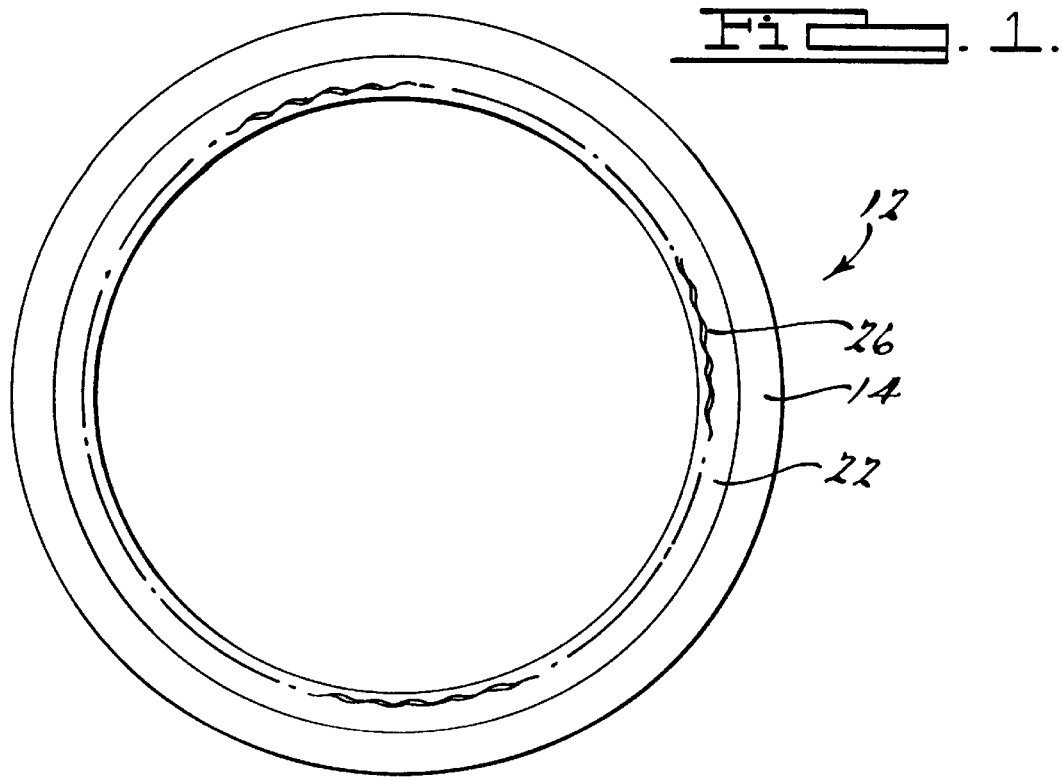
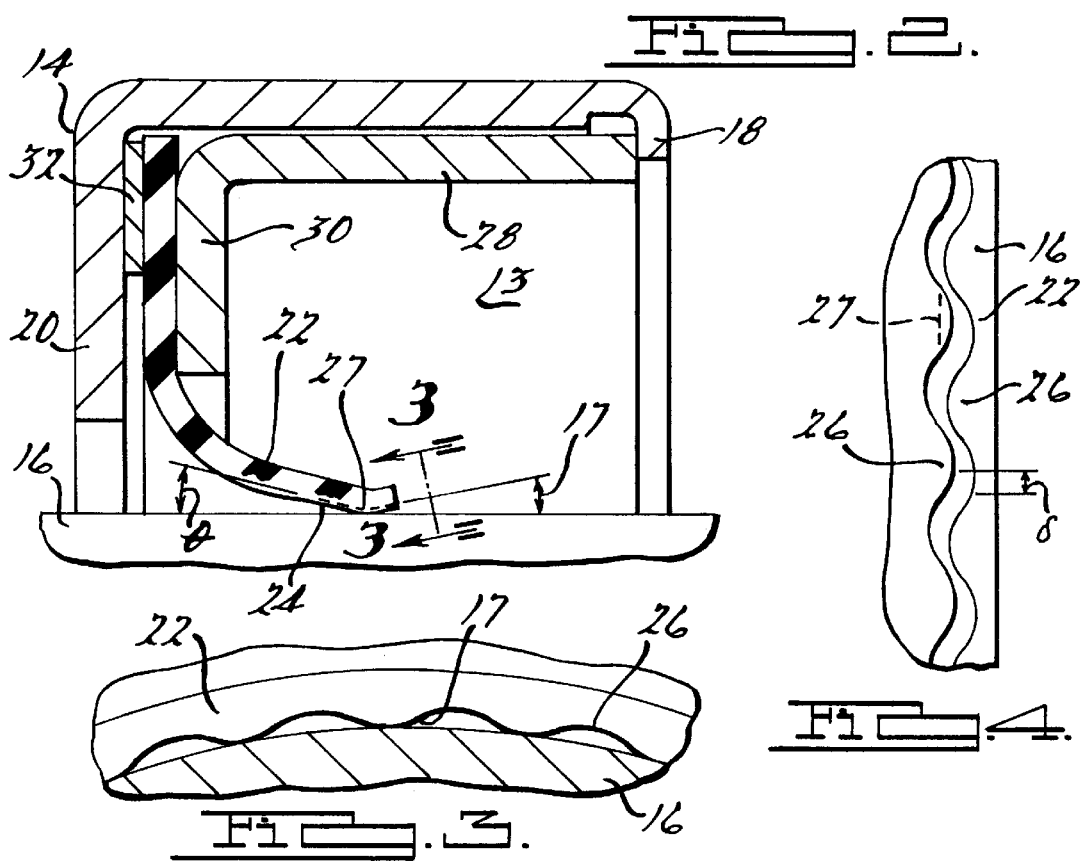

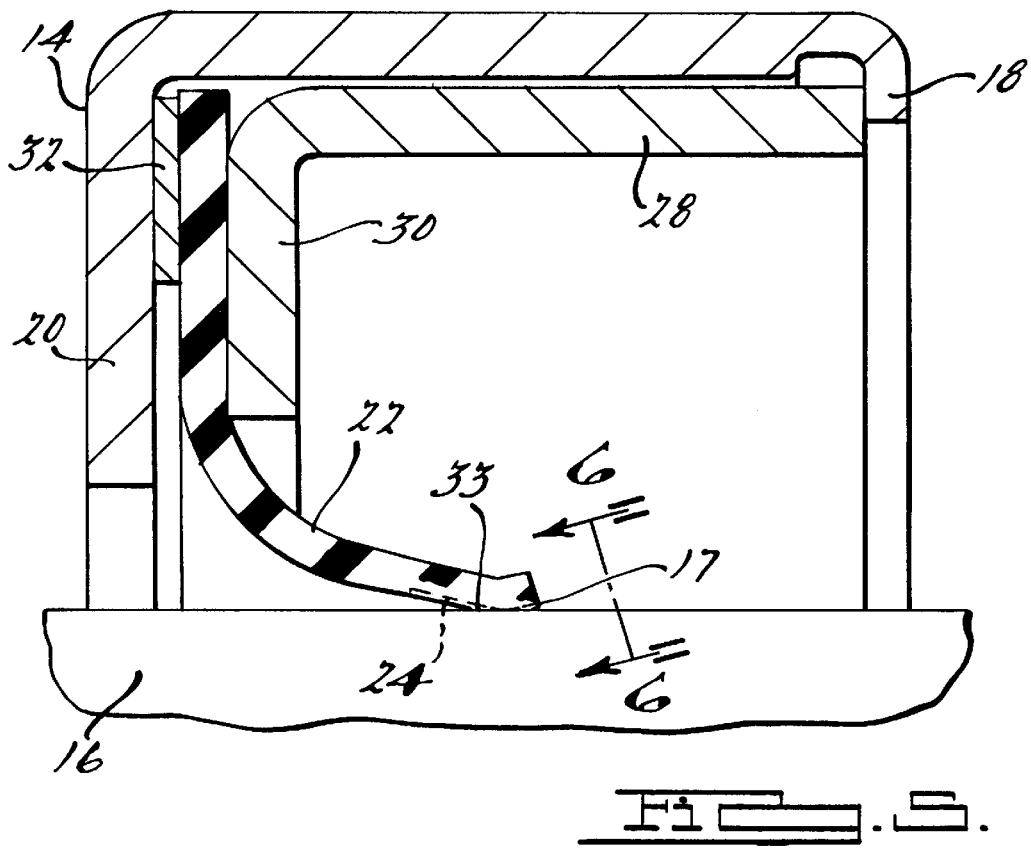
FIG. 5.
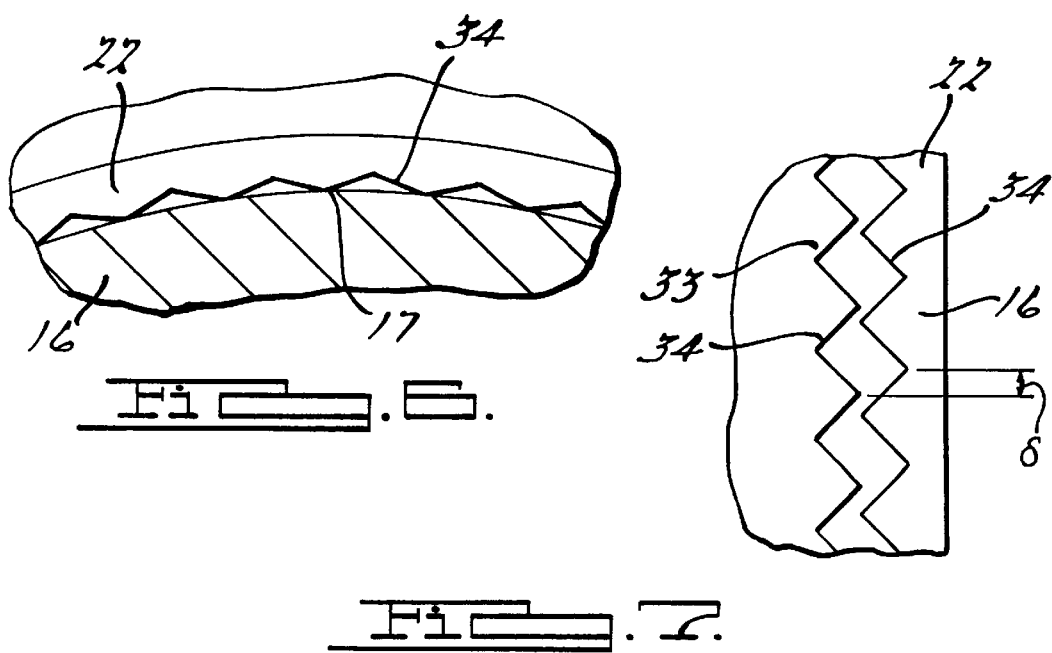
FIG. 6.
FIG. 7.

UNI-DIRECTIONAL SEAL FOR USE ON A SHAFT

BACKGROUND OF THE INVENTION

1. Field of the Invention

The present invention relates to lip seals, and more particularly to a Uni-Directional polytetrafluoroethylene (PTFE) seal for one direction of shaft rotation.

2. Description of Related Art

Lip seals have been known for years and have been found in applications when an internal seal is needed to seal off fluid with the shaft rotating in only one direction. Generally, the fluid is confined within a chamber and it is the function of the lip seal to prevent the fluid from leaking via the annular space between the interior chamber wall and the shaft. The lip seals are commonly used for sealing automotive engine crankshafts, transmission shafts, pump shafts and any other type of shaft which has a fluid/air barrier. The lip seals are generally maintained in continuous contact with a rotating shaft and have the characteristics of pumping fluid which comes in contact with the seal back towards the fluid chamber being sealed.

Many prior art seals used to control uni-directional fluid flow have been made of molded rubber. However, these rubber seals suffer from defects such as thermal embrittlement or other forms of material degradation, and do not have the ability to resist wear for long periods with sparse lubrication and have a high co-efficient of friction.

Therefore, there is a need in the art for a uni-directional PTFE seal to overcome the problems with the previous rubber lip uni-directional seals and PTFE seals that have trouble with static leakage and are not properly lubricated due to their pumping features.

SUMMARY OF THE INVENTION

One object of the present invention is to provide a uni-directional seal.

Another object of the present invention is to provide a PTFE lip seal that allows no static leakage when pressurized air tests are used to check for leaks in the seal after installation.

It is yet a further object of the present invention to provide a pumping feature that produces a lubricant under the lip before it is returned. This allows for better lubrication of the seal area.

To achieve the foregoing objects, the uni-directional seal includes a rigid shell, a support member in contact with the shell, and a resilient sealing member in contact with the support member and a washer member. The sealing member has a sealing face, where that sealing face has a contact area having a profile of a cyclically repeating shape.

One advantage of the present invention is that its contact pattern insures no static leakage during the manufacturer's pressurization test.

A further advantage of the present invention is that the pumping feature pushes the lubricant under the lip before it is returned thus providing better lubrication.

Yet another advantage of the present invention is that it provides a PTFE uni-directional seal having superior sealing and lubricating properties.

Other objects, features and advantages of the present invention will become apparent from the subsequent description and appended claims, taken in conjunction with the accompanying drawings.

BRIEF DESCRIPTION OF THE DRAWINGS

FIG. 1 shows a plan view of the present invention.

FIG. 2 shows a cross section of the seal according to the present invention.

FIG. 3 shows a view taken along line 3—3 of FIG. 2.

FIG. 4 shows the contact pattern from FIG. 3 made on the shaft surface.

FIG. 5 shows a cross section of an alternate embodiment of the present invention.

FIG. 6 shows a view taken along line 6—6 of FIG. 5.

FIG. 7 shows the contact pattern from FIG. 6 made on the shaft surface.

Figure 8:
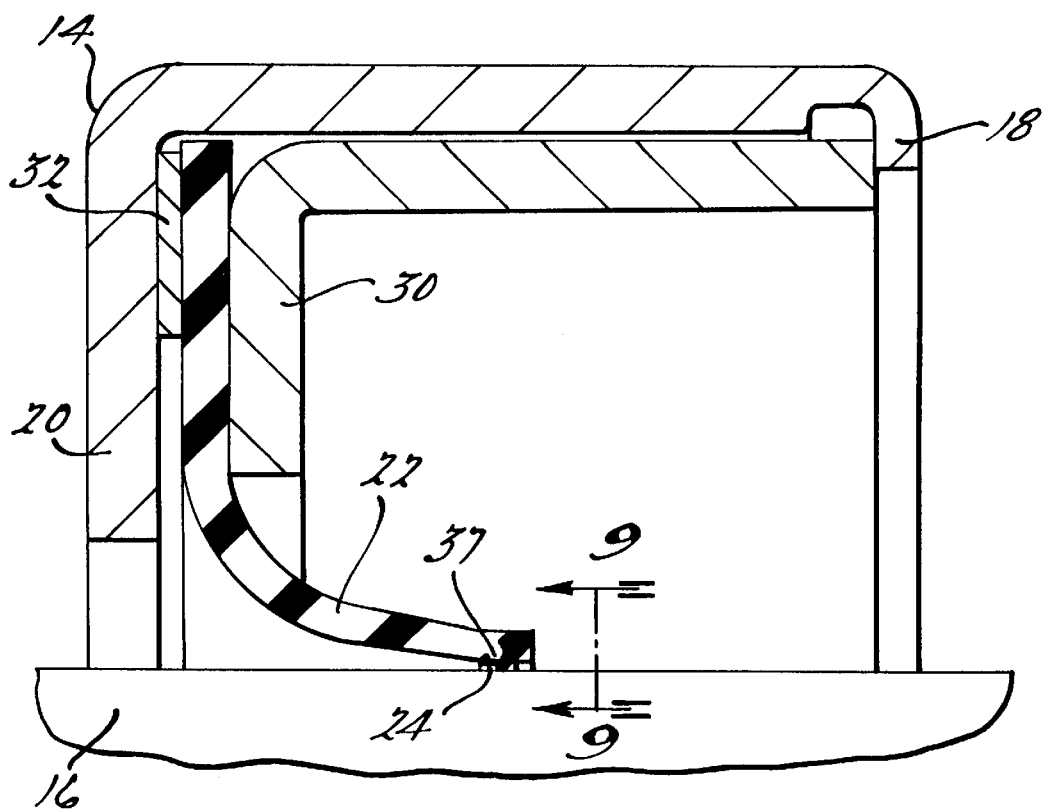
FIG. 8 shows a cross section of an alternate embodiment of the uni-directional seal.

BEST MODE OF CARRYING OUT THE INVENTION AND DESCRIPTION OF THE PREFERRED EMBODIMENT(S)

Referring to the drawings, a uni-directional seal 12 is shown. The uni-directional seal 12 includes a rigid circumferential shell 14, the rigid shell 14 is placed within an engine or gear box environment and is use to create a seal along a rotating shaft 16. The seal 12 separates an oil side 13 from an air side 15 thus keeping the oil from leaking around the shaft 16 causing unnecessary loss of oil. The rigid circumferential shell 14 includes a radially inwardly extending flange 18 on one end and on the opposite end a radially inwardly extending end wall 20. In the preferred embodiment the rigid circumferential shell 14 is made of a metal material but it should be noted that any other rigid material such as ceramics or other hard plastic materials may be used for the rigid shell depending on the application and the specific requirements of the engine operating environment.

As shown in FIGS. 2 through 10, the uni-directional seal 12 also includes a resilient sealing member 22, preferably made of a polytetrafluoroethylene (PTFE) material but it should be noted that any other resilient rubber or plastic or ceramic material may be used depending on the operating environment of the seal. The resilient sealing member 22 has an indented portion or sealing face 24 on one end thereof which will produce a specific surface pattern in the sealing area of the sealing member 22 which comes in contact with the rotating shaft 16. The specific surface pattern provides hydrodynamic pressure producing spaces, which are of equal potential, on both the oil and air side of the barrier created by the contact or sealing area of the resilient member 22. The specific surface pattern also forms a contact pattern which presents a different resistance to the fluid flow arising from the induced hydrodynamic pressures on either side of the contact pattern.

The sealing area or contact area (27, 33, 37) of the sealing member 22 contacts the circumference of the shaft 16 to form a corresponding contact area on the surface of the shaft 16 and is produced by the resilient sealing member 22. The sealing area has two identical, or similar profiles of a cyclically repeating shape 26 which are side-by-side but slightly out of phase by δ as shown in FIG. 4. The cyclically repeating shape 26 may either be of a continuous nature or may be of a discontinuous nature. In the preferred embodiment the continuous profile is that of a sinusoid 26, but it may be of any other continuous function such as a blended radii, a cosine or any other continuous repeating function. An alternate embodiment of the present invention includes a discontinuous type repeating shape such as a triangular shape 34, however it should be noted that any other discontinuous shape may also be used such as a square, octagon or any other such discontinuous shape function. Yet another alternate embodiment of the cyclically repeating shape may included a combination of both a continuous and discontinuous function or shape, such as a combination of a semi-circle and straight line pattern 36 on the contact area. However, any other combination may be used for a combination of a continuous or discontinuous shape on the sealing area. The two profiles on either side on the contact area must not be in phase with each other nor one half cycle out of phase with each other.

The surface of the PTFE resilient sealing member 22, immediately above and next to the cyclically repeating shapes contacts the surface of the shaft 16. The edges of the cyclically repeating shapes converge at a point 17 with the circumference of the shaft 16 to form a shallow angle $\theta$. As the shaft 16 rotates, the similar cyclically repeating shapes in the contact area of the seal 22 produce a periodic or oscillatory pattern in the corresponding contact area on the surface of the shaft 16 to the edge of the sealing member 22, forming the limit 19 of the contacting surface on the shaft 16. This will induce hydrodynamic pressures over those swept areas between the extremities of the cyclically repeating edged pattern which are not in contact with the shaft 16. This will in turn send the oil back towards the oil side of the sealing area. The two cyclically repeating edge patterns 26 can not be identically following nor mirror images of one another. The relative displacement $\delta$ of the edge patterns 26 in combination with the direction of motion of the shaft 16 determines the direction of the net pumping effect of the uni-directional seal design.

FIG. 3 shows a view taken along line 3—3 of FIG. 2 of the resilient sealing member 22 against the shaft 16 during operation. As FIG. 3 shows, the cyclically repeating shape extends radially onto the shaft surface 16 on either side of the contact area. FIG. 4 shows the contact pattern as seen on the shaft 16 while rotating. As the figures show the two separate cyclically repeating shapes are off-set from one other. This means they are not in phase with one another but not more than one half cycle out of phase with each other.

Figure 9:
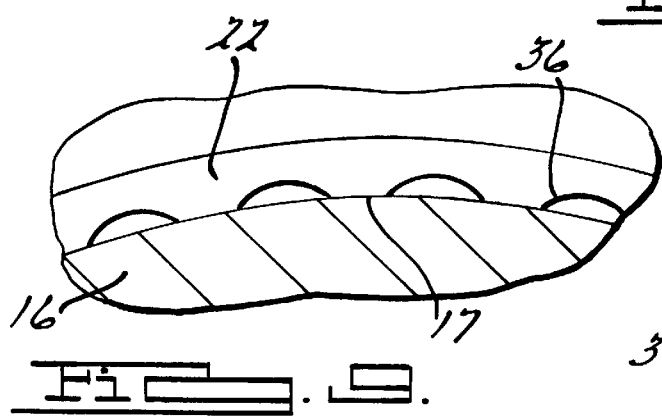
FIG. 9 shows a view along line 9—9 of FIG. 8.
Figure 10:
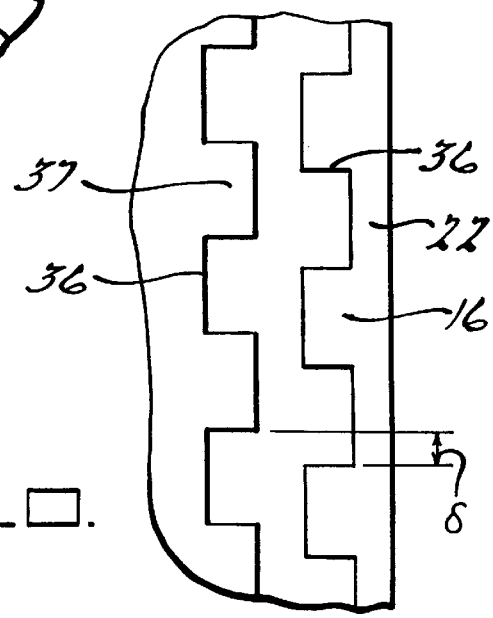
FIG. 10 shows the contact pattern from FIG. 9 made on the shaft surface.

FIGS. 5 through 7 show a discontinuous cyclically repeating shape such as a triangle. FIG. 7 shows the off set nature of the two cyclically repeating shapes and also that they are not more than one half out of phase with each other. FIGS. 8 through 10 show a combination of both a discontinuous and continuous shape of the cyclically repeating shape. FIG. 10 shows a contact pattern 38 developed on the shaft 16 using the combination cyclically repeating shape for the two surface patterns bounding the contact area of the resilient sealing member 22. Any of the above three contact patterns ensures that no static leakage will occur during the manufacturer's pressurization test where air is immediately blown in after assembly to check for leaks. It should also be noted that the pumping feature of the contact pattern pushes the lubricant under the lip before it is returned to the oil side of the seal. This provides for better lubrication between seal and shaft.

A support member 28 is held within the rigid shell 14 and in contact with a top portion of the resilient sealing member 22. The support member 28 has a generally L-shaped cross section which includes a radially extending end wall 30. The support member 28 is held between the radially extending flange 18 of the rigid shell 14 and the resilient sealing member 22 top portion.

A washer 32 is also placed and held between the top portion of the resilient sealing member 22 and the end wall 20 of the rigid shell 14. The washer 32 has a circumferential shape and is ring like in appearance. The washer is used to hold the resilient sealing member 22 securely between the support member 28 and the end wall 20 of rigid shell 14. The length of the end wall 30 of the support member creates a bending moment which allows the resilient sealing members contact area to be seated and aligned correctly with the rotating shaft 16 such that the two cyclically repeating shapes 26 bound a contact area of the resilient sealing member 22. The support member 28, washer 32 and resilient sealing member 22 are press fitted within the rigid shell 14 in the preferred embodiment but it should be noted that any other type of securing means may be used such as welding, spot welding, or any other bonding method necessary to correctly secure and support the resilient sealing member 22 within the rigid shell 14.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise then as specifically described.

What is claimed is:

1. A uni-directional seal to prevent leaking of lubricant along a shaft said seal having a lubricant side, said seal including:
   a rigid shell;
   a support member in contact with said shell;
   a resilient sealing member in contact with said support member and an insert washer member, said sealing member having a sealing face, said sealing face having a contact area which is bounded by a plurality of profiles of a cyclically repeating shape said plurality of profiles contacting the shaft so that when the shaft rotates in one direction, the lubricant is moved away from said sealing face toward the lubricant side.

2. The seal of claim 1 wherein said rigid shell includes a radially extending end wall and a radially extending flange.

3. The seal of claim 2 wherein said rigid shell is made of a metal material.

4. The seal of claim 1 wherein said support member is made of a metal material.

5. The seal of claim 1 wherein each of said plurality of profiles extends in a radial direction and said contact area is indented.

6. The seal of claim 5 wherein each of said plurality of profiles includes similar profiles.

7. The seal of claim 6 wherein each of said plurality of profiles have different phases.

8. A uni-directional seal to prevent leakage of lubricant along a shaft, said seal having a lubricant side, said seal including:
   a rigid circumferential shell;
   a support member in contact with said rigid shell, said support member having a generally L-shaped cross section;
   a resilient sealing member in contact with said support member and an insert washer, said sealing member having a sealing face, said sealing face bounded by two similar profiles having a cyclically repeating shape, said two profiles being less than one half cycle out of phase with each other, said cyclically repeating shape forms a contact area on the shaft with different resistances to fluid flow induced by hydrodynamic pressures on either side of said contact area, said sealing member in constant contact with said shaft so that when the shaft rotates, the lubricant is moved away from said contact area by said repeating shape toward the lubricant side.

9. The seal of claim 8 wherein said cyclically repeating shape is a continuous shape.

10. The seal of claim 9 wherein said continuous shape is a sinusoid.

11. The seal of claim 8 wherein said cyclically repeating shape is a discontinuous shape.

12. The seal of claim 11 wherein said discontinuous shape is triangular.

13. The seal of claim 8 wherein said cyclically repeating shape is a combination of a continuous shape and a discontinuous shape.

14. The seal of claim 13 wherein said combination includes a semi-circle and a straight line.

15. The seal of claim 8 wherein said resilient sealing member is made of a polytetrafluoroethylene (PTFE) material.

16. A uni-directional seal to prevent leakage of lubricant along a shaft, said seal having a lubricant side, said seal includes:

a rigid circumferential shell, said rigid shell having a radially extending end wall and a radially extending flange;

a support member having a radially extending end wall, said support member in contact with said flange;

a resilient sealing member held between said support member and a washer member, said sealing member in constant contact with the shaft, said sealing member having a sealing face, said sealing face including two similar cyclically repeating shapes, said cyclically repeating shapes extend in a radial direction, said cyclically repeating shapes being less than one half cycle out of phase with each other, said cyclically repeating shapes bounding a sealing area for said shaft so that when the shaft is rotated, the lubricant is moved away from said repeating shapes toward the lubricant side.

17. The seal of claim 16 wherein said resilient sealing member is made of a polytetrafluoroethylene material.

18. The seal of claim 16 wherein said cyclically repeating shapes are a sinusoid.

19. The seal of claim 16 wherein said cyclically repeating shapes are triangular.

20. The seal of claim 16 wherein said cyclically repeating shapes are a combination of semi-circles and straight lines.

* * * * *